United States Patent
Hasebe et al.

(10) Patent No.: US 7,062,352 B2
(45) Date of Patent: Jun. 13, 2006

(54) METHOD FOR DISPLAYING TOOL LOCUS IN NC DATA AND METHOD FOR ANALYZING NC DATA

(75) Inventors: Takao Hasebe, Niwa-gun (JP); Tooru Yamamoto, Niwa-gun (JP); Noriyoshi Itou, Niwa-gun (JP); Takuya Kato, Niwa-gun (JP)

(73) Assignee: Okuma Corporation, Aichi (JP)

( * ) Notice: Subject to any disclaimer, the term of this patent is extended or adjusted under 35 U.S.C. 154(b) by 271 days.

(21) Appl. No.: 10/438,894

(22) Filed: May 16, 2003

(65) Prior Publication Data

US 2003/0216830 A1 Nov. 20, 2003

(30) Foreign Application Priority Data

| May 17, 2002 | (JP) | ............................. 2002-142566 |
| Jun. 20, 2002 | (JP) | ............................. 2002-180627 |
| Jun. 20, 2002 | (JP) | ............................. 2002-180628 |

(51) Int. Cl.
*G05B 19/406* (2006.01)
*G06F 19/00* (2006.01)

(52) U.S. Cl. .................. 700/184; 700/90; 700/180
(58) Field of Classification Search ................ 700/90, 700/159, 180, 184
See application file for complete search history.

(56) References Cited

U.S. PATENT DOCUMENTS

| 5,410,489 A | * | 4/1995 | Seki et al. .................. 700/187 |
| 6,014,148 A | * | 1/2000 | Tankelevich ................. 345/442 |
| 6,587,747 B1 | * | 7/2003 | Hirai et al. .................. 700/189 |

* cited by examiner

*Primary Examiner*—Jayprakash N. Gandhi
(74) *Attorney, Agent, or Firm*—Oliff & Berridge, PLC

(57) ABSTRACT

With respect to two or more NC data points among a group of dots together representing a tool locus, a curvature radius of the tool locus is determined. Then, the NC data point and its succession with other points is displayed in a display color determined according to the magnitude of the curvature radius. Alternatively, a movement direction of each minute segment relative to a specific axis selected from the three (XYZ) axes is determined as either positive, negative, or zero, and the minute segment or an end point thereof is display with the display property determined according to the movement direction. Still alternatively, after a specific axis is selected from the three (XYZ) axes, a region relative to the selected region is divided along the selected axis, for predetermined dividing width, first beginning with a predetermined reference point, and the resultant divided regions are given predetermined display properties. Then, a tool locus is displayed in the three-axial (XYZ) system according to the display properties given to the respective divided regions.

13 Claims, 19 Drawing Sheets

- ≡≡≡ : COLOR A (RISING)
- ▬▬▬ : COLOR B (DESCENDING)
- ——— : COLOR C (HORIZONTAL)
- ● : COLOR D (APEX)
- ○ : COLOR E (BOTTOM POINT)

METHOD FOR DISPLAYING TOOL LOCUS IN NC DATA AND METHOD FOR ANALYZING NC DATA

BACKGROUND OF THE INVENTION

1. Field of the Invention

The present invention relates to a method for displaying a tool locus defined by NC data, and in particular to an improved method for displaying a tool locus defined by NC data for machining a surface having any shape, as successive dots aligned at a minute interval.

The present invention also relates to an improved method for displaying a tool locus defined by NC data for machining along minute segments defined in an XYZ-axial system, as a collection of minute segments or end points attached thereto.

The present invention further relates to an improved method for displaying based on data defined in five-axial system which additionally comprises A and B rotary axes.

2. Description of the Related Art

For machining a surface having a complicated shape, including die machining, NC-controlled machining is employed in a wide range of machining applications. For example, by using NC data prepared in CAD/CAM, any machining device, such as a machining center, capable of high speed feeding can achieve highly accurate and efficient machining for the complexity. In general, shape data for a machining object prepared by CAD or the like is converted into desired NC data in a CAM system. The NC data may comprise, for example, tool locus data and control data. Tool locus data is defined using XYZ axes. Control data may include a tool number, a feeding speed, a main spindle rotation speed, and so forth. Tool locus and control data are both supplied to machining devices such as a machining center.

Any defects caused on a surface which is machined based on NC data may be attributed to either the machining device or NC data in use. Specifically, NC data may be affected by errors in the CAD data or due to capacity tolerance due to a limited calculation speed, memory size, or the like, of a computer system used in CAM processing. Such a defect may often be as small as a few μm, or even smaller. When a machining device causes the defects, Locations of the defects can be predicted.

Whenever a defect is found, NC data is immediately analyzed. However, because very fine and precise machining often necessitate millions of dots to constitute dot data defining a tool locus, evaluation of the coordinate value of every dot is impossible.

Here, a CAM system is capable of displaying a created tool locus so that whether or not a desired shape is embodied as originally intended or the machining surface is free from any interference but with a tool can be confirmed. Although the image of a tool locus can be presented in an enlarged size, the magnification power is generally 1:1 for vertical: horizontal directions. This is not sufficient for an operator viewing the image on the monitor screen to find any disturbance of, for example, approx. 0.001 mm in the dot alignment with an interval of, for example, 1 mm or greater.

FIG. 1 shows several tool loci 101 for machining a curved surface 100 of a product W, and FIG. 2 shows an enlarged image of the portion B in FIG. 1. It is almost impossible, by only looking at the enlarged image B, to tell that these dots are not necessarily in smooth succession.

With the above as background, there has existed a strong demand for the ability to instantly understand, without delay, the location of any potential machining device-attributable defects and/or irregularity in shape of one or more tool locus/loci defined by NC data.

SUMMARY OF THE INVENTION

The present invention has been conceived in order to obviate or mitigate the aforementioned disadvantages, and advantageously provides a novel tool locus displaying method capable of displaying a tool locus so as to enable ready detection of defects.

In order to produce the above advantages, according to the present invention, there are provided a method for displaying a tool locus defined by NC data and a method for analyzing NC data.

Specifically, according to the method for displaying tool locus defined by NC data for machining a machining object by means of three-axial (XYZ) feeding, predetermined display property according to NC data is given to the NC data, and the tool locus is displayed in a display mode suitable for the given display property.

Further, a curvature radius of a 3D arc defined by an NC data point and its adjacent data points on its both sides, at the NC data point is obtained, so that the NC data or it succession with other dots is displayed according to the display property determined according to the magnitude of the curvature radius.

According to the present invention, a curvature radius at any NC data point or curvature radii at all NC data points can be obtained simultaneously with the relevant tool locus, and significant change in the curvature radii indicates breakage of smooth continuity of the tool locus, suggesting a potential machining defect at that point.

Further, when a machining defect is caused in actual machining, whether or not the location of the machining defect coincides with the breakage of the continuity of curvature radii is determined through comparison between the actual machining defect and a tool locus displayed according to the present invention. This can significantly contribute to enabling determination of a cause of the defect.

Here, although display property can be embodied using any method, generally, variation of colors is preferably used. For example, convex features may be displayed in one desired color, e.g., red, while concave features are displayed in a different color, e.g., blue. Further, gradation of color brightness according to the magnitude of a curvature radius is also preferably employed. It should be noted that, in addition to colors, radial segments, circles, numeric representation, graphic representation, and so forth, are also preferably used to express display property.

In addition, in order to produce the afore-mentioned advantages, according to the present invention, there is provided a method for displaying a tool locus defined by NC data for machining a machining object by utilizing minute segments defined by the three (XYZ) axes, according to a predetermined rule.

One example of a predetermined rule may be a rule that movement of a minute segment relative to a specific axis selected from the three (XYZ) axes is evaluated to determine if it directs in a positive, negative, or zero direction, and a different display property is given with respect to a different movement direction. Then, the minute segment or an end point attached thereto relative to the specific axis is displayed with the given display property.

That is, according to the present invention, a movement direction of a minute segment is expressed by means of, for example, a different color given to the minute segment or an end point attached thereto. This arrangement allows ready recognition of concave, convex, or the like, of a tool locus relative to the specific axis.

In addition, according to the present invention, accuracy of NC data can be verified based on a tool locus displayed according to the above-described method.

Specifically, NC data may be displayed in advance to find any defect, such as concavity or convexity. Should any machining defect be caused on a machining object which is machined based on the NC data, the machining defect and the tool locus displayed with given display property may be compared to each other for verification of the accuracy of the NC data.

Further, according to the present invention, when movement directions of two successive minute segments among those relative to a specific axis differ, a point at which the two successive minute segments are connected is displayed as a change point, highlighted with a marker. This arrangement allows ready recognition of a rigid or bottom line, which is a collection of change points in the movement direction.

Still further, according to the present invention, when movement directions of first and second segments of a tool locus are reversed from each other, display properties indicative of reversed movement directions may be given.

Another example of a predetermined displaying rule may be such that a region is divided, in the direction of the specific axis selected from the three (XYZ) axes for displaying a tool locus, into divided regions of predetermined dividing width, beginning with a desired reference point, and that a predetermined, preferably unique, display property is given to each of the divided regions. Then, the tool locus to the specific axis is displayed according to the given display properties in the three-axial (XYZ) system.

That is, according to the present invention, display property differs for every divided region relative to the specific axis, an arrangement which allows ready determination of cyclicity (a cyclical nature) or the like of a tool locus relative to the specific axis.

In addition, according to the present invention, accuracy of NC data can be verified using a tool locus displayed according to the above described method.

That is, when any machining defective line is caused on a machining object which is machined based on NC data, whether a cause of the defective line is attributable to the NC data or the machining device can be readily determined using the method for displaying a tool locus according to the present invention described above.

Specifically, a defective line attributable axis, for example, the Z axis, is specified from among the three (XYZ) axes with reference to the machining defective line caused on the machining object, and a line cycle in the direction of the Z axis is determined based on a machining defective line which appears cyclical caused on the machining object.

Then, while using one of the defective lines relative to the axis specified from among the three axes, the Z-axis in this example, as a reference point, a region relative to the specified axis is divided for every width corresponding to the line cycle which is determined based on the machining defective line on the machining object, and the tool locus is displayed in the three-axial (XYZ) system according to the predetermined display properties given to the respective divided regions.

When the machining defective line on a machining object coincides with the displayed pattern of a tool locus drawn with the display property, it can be concluded that the machining defective line on the machining object is cyclical, and an estimation can be made that the NC data is accurate and that the machining device is responsible for the defective line.

This conclusion can be reached because a cyclical line, which is a cyclical defect, is unique to a machining device, and almost irrelevant to NC data. Therefore, when a machining defective line is caused and it is found to be cyclical, it can be experientially concluded that the machine device is responsible for the defective line. Thus, analysis on NC data is unnecessary, leaving only the need of check-up with the machining device.

Here, whereas whether or not a machining defective line caused in machining a surface in a simple shape, such as an inclined surface, as shown in FIG. 3, is cyclical may be visually and readily determined, such determination may not often be readily made with respect to a machining defective line which is caused in machining a complicated curved surface, as shown in FIG. 4, because the shape of such a machining defective line is also complicated.

The NC data displaying method of the present invention can be applied in even the latter case, and can determine whether or not such a machining defective line is cyclical. That is, the present invention allows readily recognition of the cyclicity of a tool locus because the tool locus is displayed with different display properties given to the respective divided regions relative to the specified axis, as described above.

Once it is determined that a machining device is responsible for a machining defective line, analysis of NC data is unnecessary. Therefore, determination of a cause of the defective line can be promptly made without any analysis of NC data.

For five-axial NC data (three axis of XYZ axes and two AB rotary axes), when displaying coordinate values relative to the three (XYZ) coordinate values indicative of the position of the tip end of a tool blade and calculated in consideration of a distance between the rotation center and the tip end of the tool, change of movement directions are expressed by means of different colors. This allows ready detection of a position with a potential machining defect due to backlash of a rotary axes.

DESCRIPTION OF THE PREFERRED EMBODIMENTS

Embodiments of the present invention are described as follows.

Embodiment 1

Figure 1:
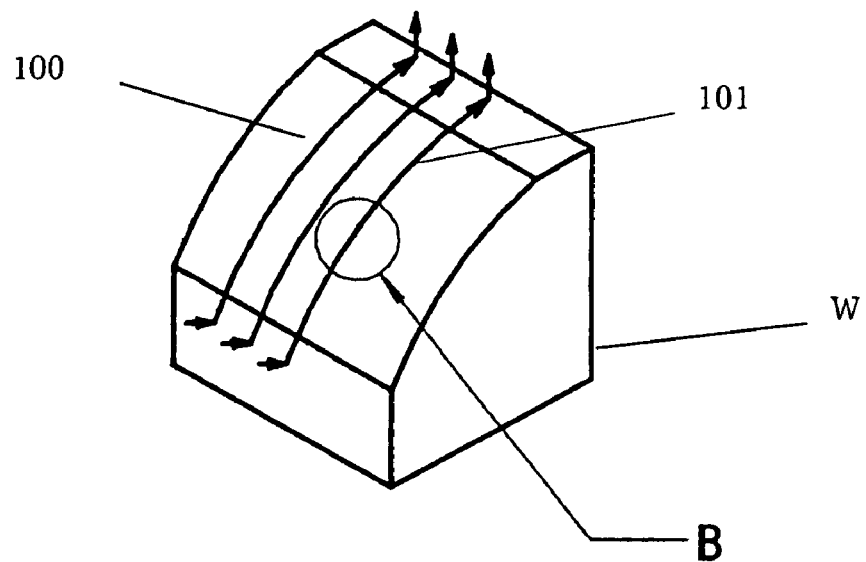
FIG. 1 is a figure explaining a relationship between a conventional machining shape and a tool locus.
Figure 2:
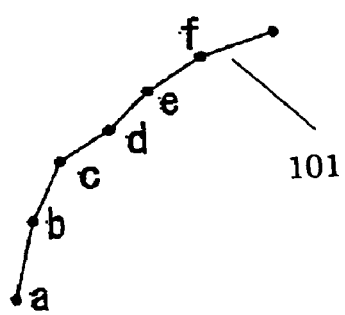
FIG. 2 is an enlarged figure showing a part of the tool locus in FIG. 1.
Figure 3:
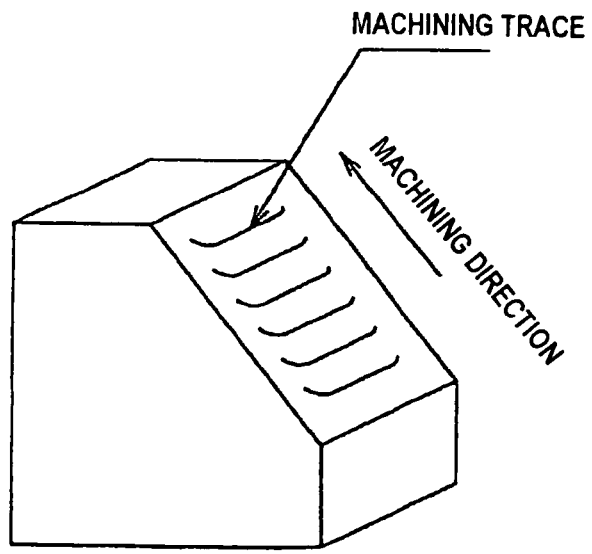
FIG. 3 is a figure explaining an example of a machining defective line.
Figure 4:
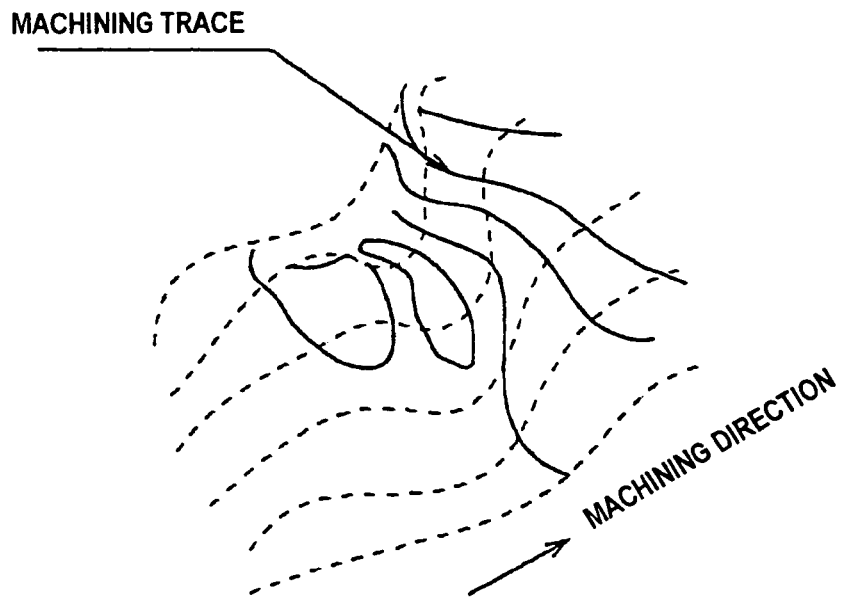
FIG. 4 is a figure explaining an example of a machining defective line caused while machining a surface having a complicated shape.
Figure 5:
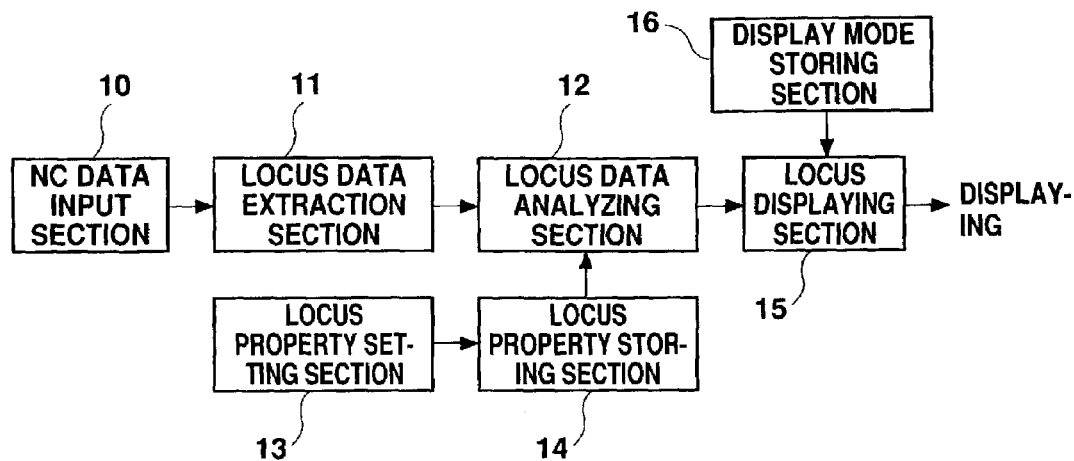
FIG. 5 is a block diagram showing a display device for practicing a tool locus displaying method in a first embodiment of the present invention.

FIG. 5 is a block diagram showing a display device for performing a display method according a first embodiment of the present invention. XYZ axial data is input from an NC data input section 10, and sent to a locus data extraction section 11. In the locus data extraction section 11, only tool locus data is extracted from the XYZ axial data to thereby eliminate other control data. The extracted tool locus data is supplied to a locus data analyzing section 12, where desired display property is imparted thereto, which is characteristic in this embodiment.

This embodiment is characterized in that a curvature radius of a tool locus at each of two or more NC data points extracted from a group of dots together representing the tool locus is obtained, and that display property is assigned to the point according to the magnitude of the obtained curvature radius, so that the point itself and its relationship to surrounding points are displayed with the assigned display property.

Therefore, a curvature radius at each of the NC data points can be known from the displayed pattern, and a variety of NC data analyses can be applied based on the displayed pattern of a tool locus which is drawn with the selected display property. The analysis may include whether or not the originally intended tool locus is correctly embodied, and whether or not the original NC data is accurate, which may be determined based on whether or not the displayed pattern and an actual machining defect coincide to each other, and so forth. Pattern confirmation for every machining type may also be conducted based on various experiments, or through experience.

For impartation of display property, the device of FIG. 5 comprises a locus property setting section 13 and a locus property storing section 14. The locus property setting section 13 selectively sets a display color, a line type, or the like, which can be imparted to each data point. Based on the display property set, the locus property storing section 14 designates, with respect to each data point, displaying according to the magnitude of a curvature radius. The designation data is supplied to a locus data analyzing section 12.

Display property set as described above is supplied to a locus displaying section 15, together with the NC axial data. Based on this data, the tool locus is displayed in a three-axis (XYZ) system. Here it should be noted that, for the display, a display mode storing section 16 determines a desired display mode according to criteria such as a desired viewing angle, magnification power, and so forth.

Figure 6:
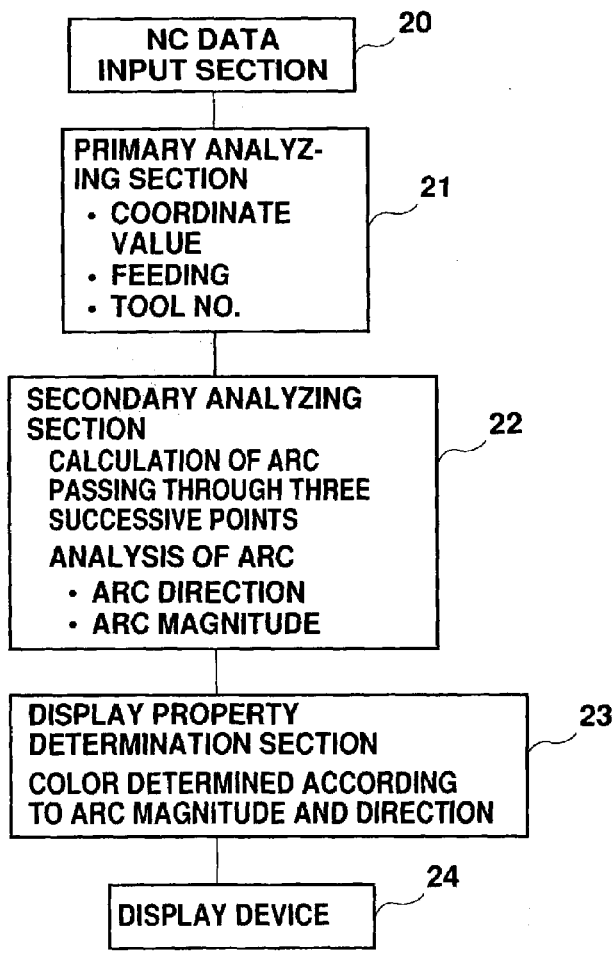
FIG. 6 is a block diagram showing an example of a display control device.

FIG. 6 is a block diagram showing a display control device for practicing a method for displaying a tool locus defined by NC data in this embodiment.

In this example, XYZ axial data and control data are input via an NC data input section 20, and a primary analyzing section 21 analyzes each dot group concerning a coordinate value, a tool feeding amount, a main spindle rotation speed, tool number, and so forth. Thereafter, tool locus data is extracted from the analyzed data, and rendered into secondary analysis in a secondary analyzing section 22, which is a characteristic of this embodiment.

In the secondary analysis, a curvature of a tool locus at each NC data point, is obtained. This is achieved by determining the direction of the projection of an arc, which passes through the NC data point, specifically, whether the arc projects upward or downward, and the magnitude of the arc, that is, a curvature radius.

Referring to FIG. 6, using three successive NC data points including a target NC data point, a curvature radius of a tool locus at the NC data point is obtained. It should be noted that all data points are not necessarily an NC data point at which a curvature radius is obtained, and that only some data points may be selected from all of the data points for use as an NC data for determination of a curvature radius. It should also be noted that determination of a curvature radius is not necessarily based on just three data points including an target NC data point, but may based on a larger number of desired data points.

As described above, a curvature radius at a desired NC data point is obtained in the secondary analyzing section 22. Then, a display property determination section 23 imparts display property according to the curvature radius.

In the example shown in FIG. 6, display property is given in the form of display colors. Specifically, a display color is given according to the direction of arc projection such that, for example, upward or downward projection is displayed in red and projection in the opposite direction in blue. Further, the magnitude of a curvature radius at an NC data point is expressed by means of gradation in brightness of the red or blue color according to its magnitude.

Data having the thus-designated display property is supplied to a display device 24 for displaying in a three-axis (XYZ) system.

Figure 7:
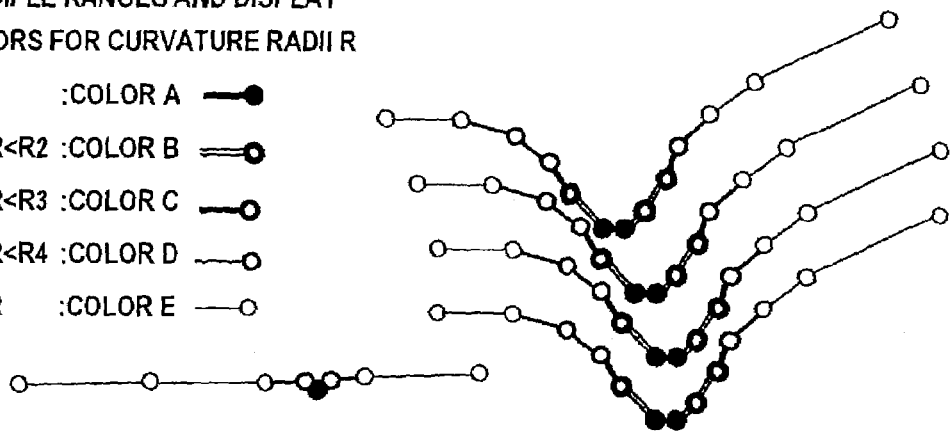
FIG. 7 is a figure explaining an example display in the first embodiment of the present invention.

FIG. 7 shows an example of a tool locus displayed in the thus imparted display colors. In this example, five colors, namely, A, B, C, D, and E, are used. Specifically, three colors A, B, and C are different shades of blue (blues with different saturation or of brightness), representing downward projection with more intensified brightness for smaller curvature radii R, and the remaining two colors D and E are similarly red of different brightness, representing upward projection with more intensified brightness for smaller curvature radii R.

Therefore, by observing the differently colored tool locus displayed on a monitor screen, whether the tool locus flows smoothly or changes abruptly by its way can be reliably known in advance. This allows correction to or intensive check of NC data on a computer.

Figure 8:
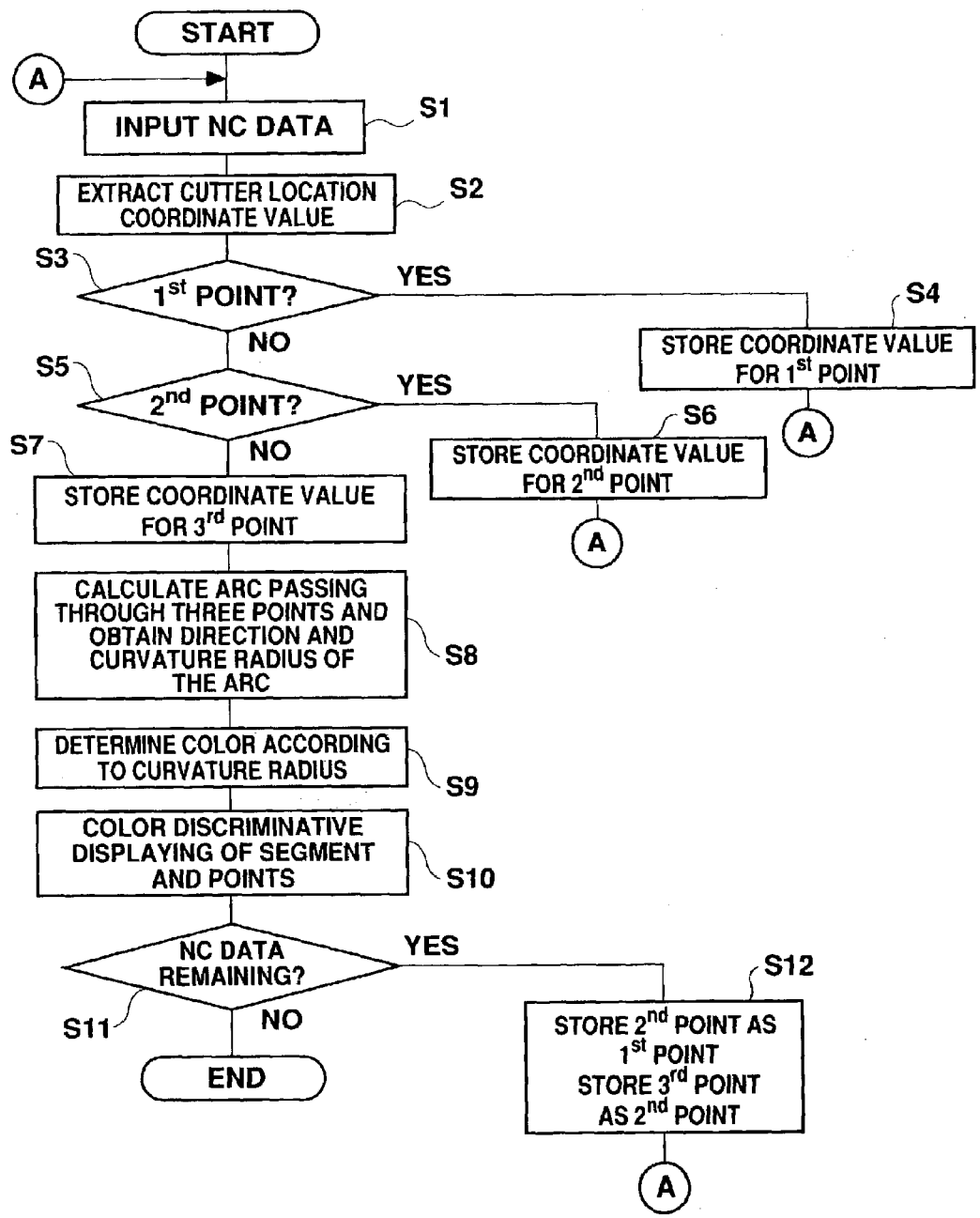
FIG. 8 is a flowchart for the first embodiment.

FIG. 8 is a flowchart of displaying in this embodiment in which display property such as is shown in FIG. 7 is imparted.

Specifically, NC data is input to a device (S1). A cutter location coordinate value indicative of one of a group of dots in alignment with a small interval representing a tool locus is extracted from the NC data (S2). Then, whether or not the extracted coordinate value relates to a first data point is determined (S3). When the extracted coordinate value does relate to a first data point, the value is stored in a memory region (S4), and the process returns to S1.

When, on the other hand, the extracted coordinate value does not relate to a first data point, whether or not the value relates to a second data point is determined (S5). When the value does related to a second data point, the value is stored in a memory region different from the above (S6), and the process returns to S1 to check a next coordinate value. Here, as a third coordinate value is judged negative, or "No", at S3 and S5, the value is stored in a memory region different from the above two, assuming that it indicates the location of a third data point (S7).

After coordinate values of the target NC data point and the two points on both sides of the target NC data point are obtained as described above, an arc passing through the three points is computed so as to determine the direction of the arc projection and its curvature radius (S8). Then, a display color is specified based on the determined projection direction and curvature radius (S9), and color displaying of the NC data point and its connected segment/segments is determined accordingly (S10).

After color display for a single NC data point is determined as described above, a next NC data point is similarly processed at S11 and S12 to determine a display color for the NC data point.

It should be noted here that, although only the target NC data point and one connected segment are shown in a predetermined color in FIGS. 7 and 8, this is merely one example of coloring, and various other manners of coloring, including those shown in FIGS. 9A–9E, are possible.

Figures 9A, 9B, 9C, 9D, 9E:
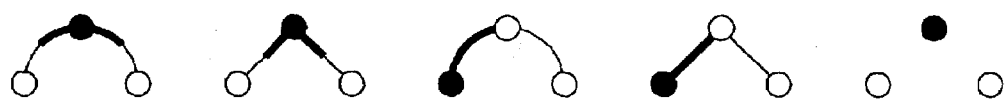
FIGS. 9A–9E is a figure explaining another example of the display of FIG. 7.

Specifically, FIG. 9A shows three points connected by a smooth arc in which the NC data point and half portions, closer to the point, of its connected segments on its both sides are colored. FIG. 9B shows an image comprising three points connected by a straight line and colored similar to FIG. 9A. FIG. 9C shows three points connected by an arc in which only one connected segment and the target data point positioned at one end of the arc and the segment connected to the target data point are colored. FIG. 9D shows three points connected by a straight line and colored similar to FIG. 9C, which is similar to the coloring in FIG. 5. FIG. 9E shows three points in which only the target data point are colored.

Figure 10:
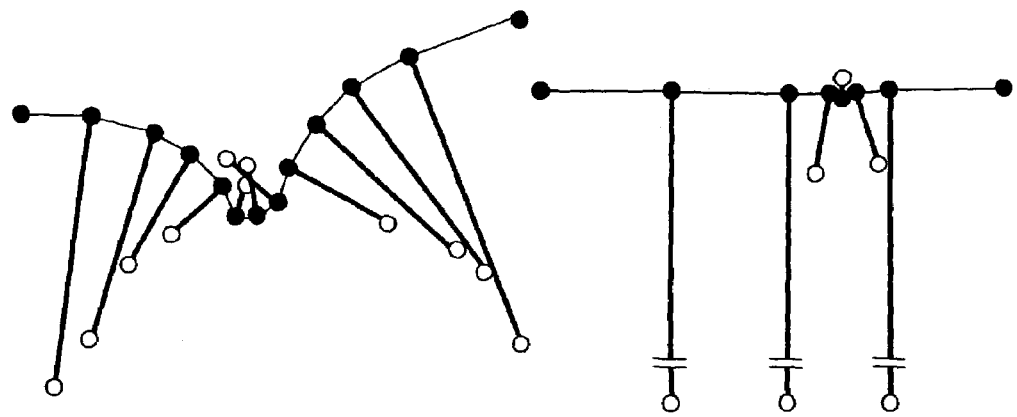
FIG. 10 is a figure showing another example display in the first embodiment.
Figure 11:
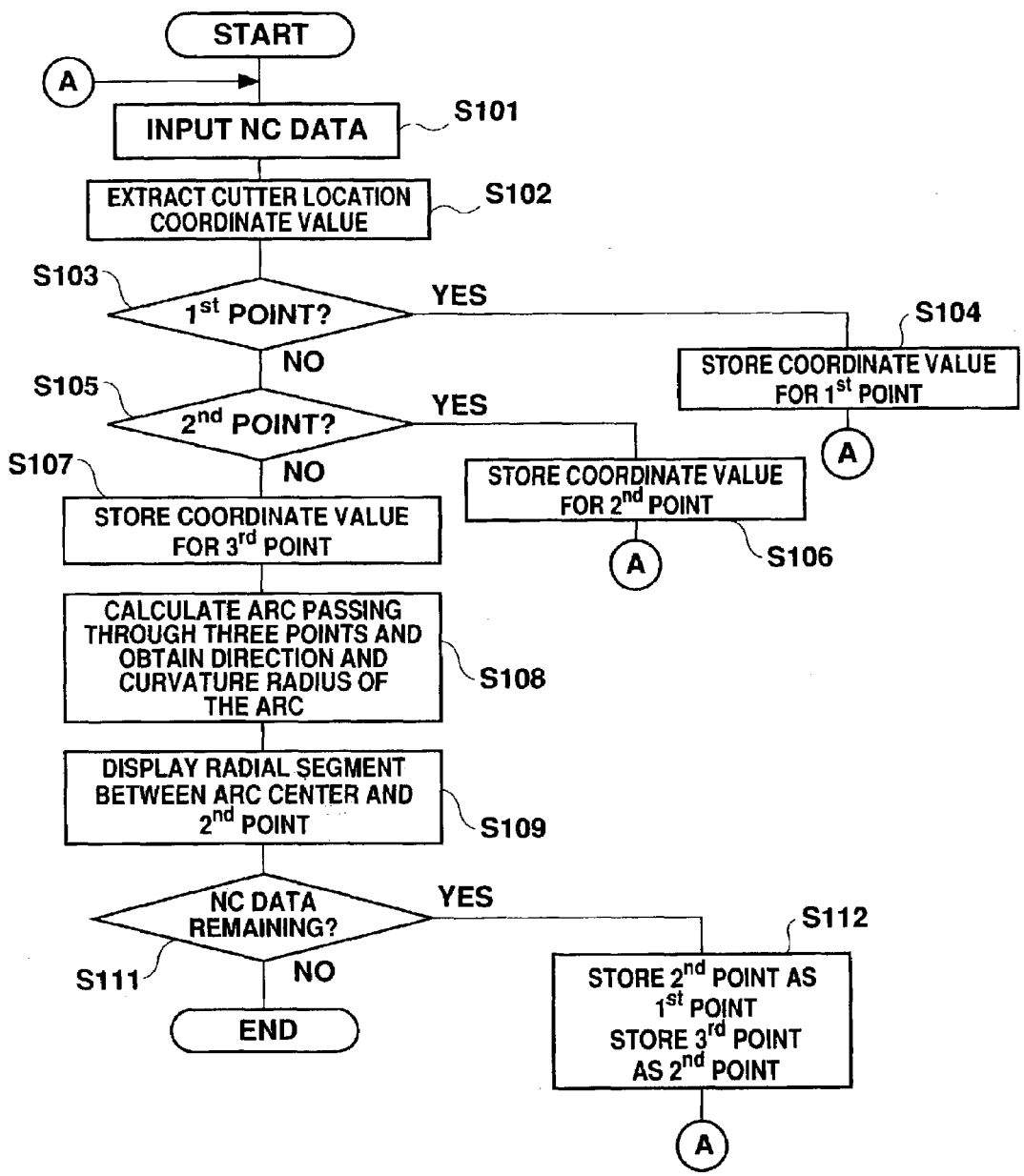
FIG. 11 is a flowchart for another example of the first embodiment.

FIG. 10 shows another example of this embodiment, in which, after obtaining the direction of the projection of an arc and the magnitude of a concerned curvature radius, a radial segment, that is, a segment connecting an NC data point and the center of the concerned curvature radius, is used for the representation. A flowchart for this example is shown in FIG. 11, which is not described in detail here as it is similar to FIG. 8. In FIG. 11, reference numbers are given in 100s.

This flowchart is characterized in that display data on a radial segment between an NC data point and the center of the concerned arc is calculated based on the direction of the arc projection and the magnitude of the curvature radius, so that displaying as shown in FIG. 10 results.

This manner of display also allows ready recognition as to whether or not a group of dots flow smoothly. Radial segments may be displayed in different colors according to the magnitude of the curvature radii and/or in size determined by multiplying a concerned curvature radius and a desired magnification power.

Figure 12:
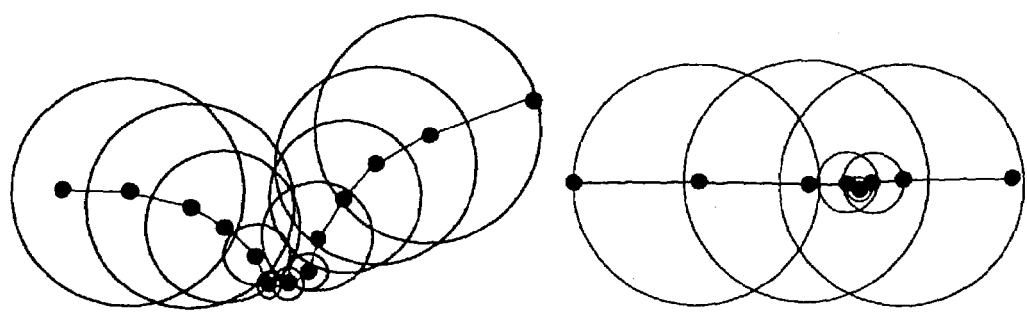
FIG. 12 is a figure showing still another example display in the first embodiment.
Figure 13:
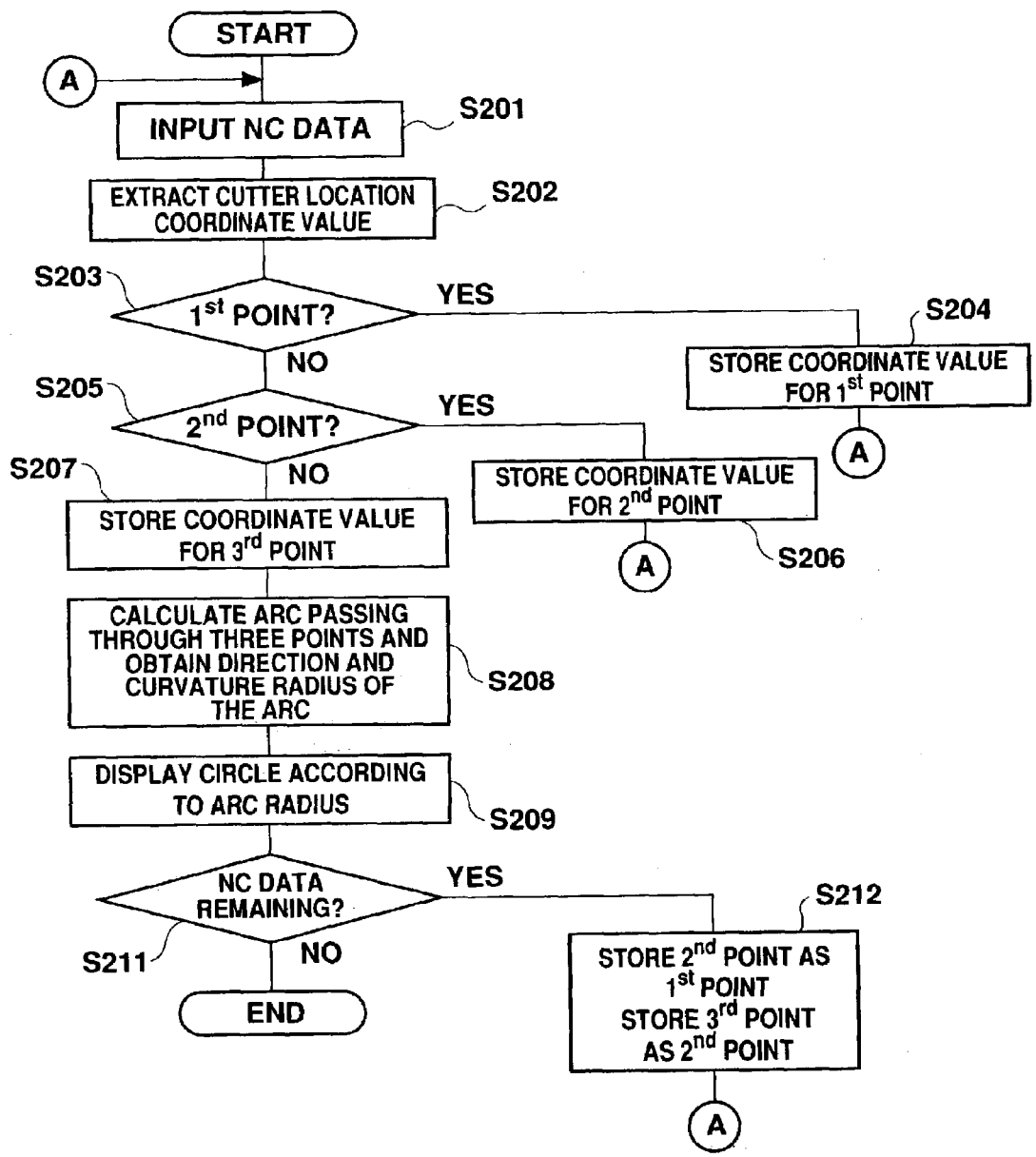
FIG. 13 is a flowchart of still another example of the first embodiment.

FIG. 12 shows another example, in which a circle having a size according to the magnitude of a curvature radius is used in representation. A flowchart for this example is shown in FIG. 13, which is not described in detail here as it is similar to FIG. 8, but in which reference numbers are given in 200s.

In this example, the magnitude of a curvature radius is solely concerned, ignoring the direction. Therefore, the magnitude of the curvature radius alone is obtained at S208, and a circle having a size according to the magnitude of a curvature radius is drawn as shown in FIG. 12 (S209). The circles may be displayed in different colors depending on the curvature radii.

Figure 14:
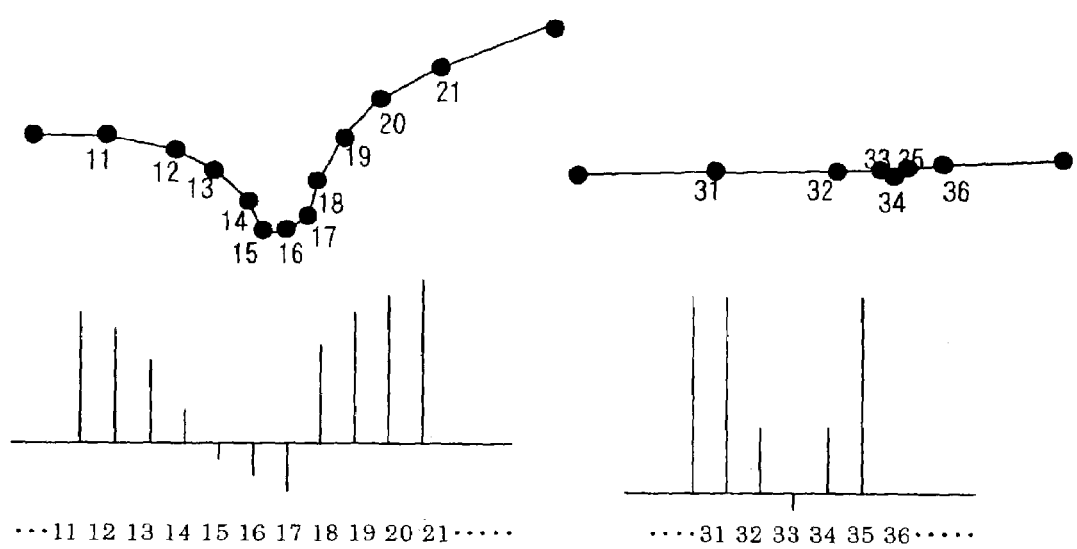
FIG. 14 is a figure showing yet another example display in the first embodiment.

FIG. 14 shows yet another example, in which, in addition to a tool locus conventionally displayed in the form of successive dots with the same display property, the direction of arc projection and the magnitude of a curvature radius are additionally shown as a graph adjacent to the tool locus. The abscissa of the graphic representation is correlated with numbers 11 to 21, 31 to 36 given to the respective points on the locus, and an ordinate indicates the magnitude and the direction.

This display also makes it possible for a user to observe on a monitor screen, of a tool locus in comparison with a change in curvature radii, allowing ready recognition of the state of change of even a complicated tool locus.

It should be noted that, instead of the numerals given to the dots in FIG. 14, numeric values, for example, +20 to −20, may also be preferably assigned to the respective dots according to the direction of arc projection and the magnitude of a curvature radius in this example.

As described above, in this embodiment, additional presentation of curvature radii at respective NC data points among a group of dots together representing a tool locus defined by NC data allows intuitive recognition as to whether or not the tool locus flows smoothly. Such a display can therefore provide a very effective means for detecting a cause of defect in data preparation and/or when any defect is caused on a machining object.

Embodiment 2

Figure 15:
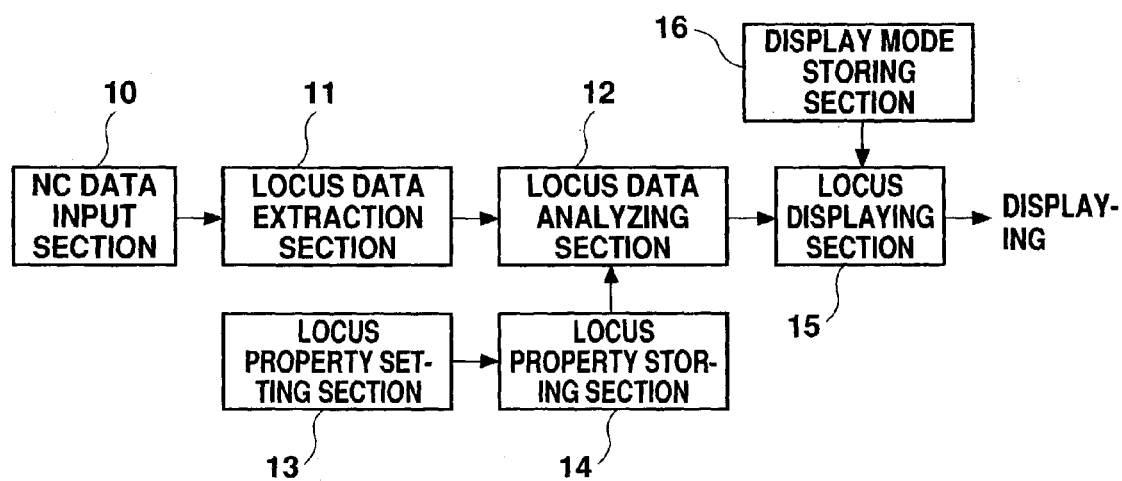
FIG. 15 a block diagram sowing a display device for practicing a tool locus displaying method according to a second embodiment of the present invention.

FIG. 15 is a block diagram showing a display device for performing a display method according to a second embodiment of the present invention. XYZ axial data is all input from an NC data input section 10, and sent to a locus data extraction section 11. In the locus data extraction section 11, only tool locus data is extracted from the XYZ axial data to thereby eliminate other control data. The extracted tool locus data is supplied to a locus data analyzing section 12, where desired display property is imparted thereto, which is characteristic in this embodiment.

This embodiment is characterized in that a movement direction of each minute segment relative to a specific axis, e.g., Z-axis, selected from the three axes is evaluated to determine if the movement directs in a negative, positive, or zero direction, and that different display property is imparted according to the determined direction. This arrangement allows discriminative displaying of concave or convex of a tool locus relative to the specific axis, e.g., Z-axis here.

Therefore, the peculiar nature of a tool locus relative to the specific axis can be readily understood from the displayed pattern on a monitor screen, and a variety of NC data analyses can be applied based on the displayed pattern of a tool locus drawn with the selected display property. The analysis may include whether or not the originally intended tool locus is correctly embodied, and whether or not the original NC data is accurate, which may be determined based on whether or not the displayed pattern and an actual machining defect coincide to each other, and so forth. In particular, as backlash is likely to be caused at a point at which movement directions are changed as quadrants are changed, strict check on a command value, a correction value, and so forth, as well as pattern confirmation for each machining type based on various kinds of experiments or through experiments, are conducted.

For assigning a display property, the device of FIG. 15 comprises a locus property setting section 13 and a locus property storing section 14. The locus property setting section 13 selectively sets a display color, a line type, and so forth, which can be assigned or imparted to each of the respective movement directions. According to the display property set, the locus property storing section 14 stores a specific axis, a coordinate value as a reference to a movement direction, information for determination as to a positive, negative, or zero movement, display colors or line types to be specified for the respective movement directions, and so forth. The designation data is supplied to a locus data analyzing section 12.

As described above, display property is imparted according to the movement direction relative to the specific axis, and the data is supplied to a locus displaying section 15 together with data on other axes. Based on the data, the tool locus is displayed with the imparted display property in a three-axis (XYZ) system. It should be noted that, for the display, a display mode storing section 16 determines a desired display mode according to a desired viewing angle, a magnification power, and so forth.

Figure 16:
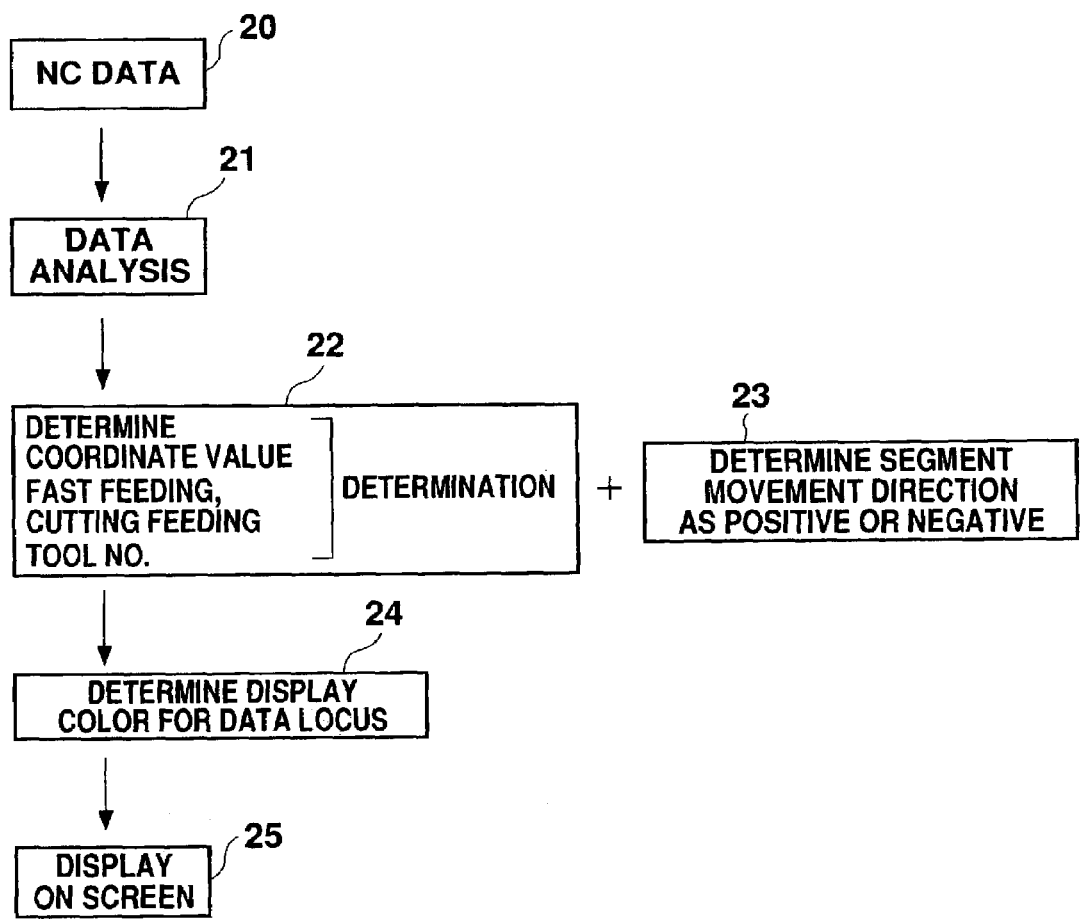
FIG. 16 is a block diagram showing an example of a process for practicing a tool locus displaying method in the second embodiment.

FIG. 16 schematically shows a process for displaying a tool locus by the above-described display device in this embodiment.

NC data 20 is processed by the display device of FIG. 15. Specifically, data on the specific axis is analyzed at S21, and, a coordinate value relative to the specific axis, and a fast feeding, a cut feeding, tool number, and so forth, are determined at S22.

This embodiment is characterized in that S23 is additionally applied at S22. At S23, a movement direction of a minute segment relative to the specific axis is evaluated so as to determine whether the movement directs in a negative, positive, or zero direction. Subsequently, a display color is determined (S24), and the tool locus is displayed in color which is discriminatively determined according to a movement direction, by the display device (S25).

Figure 17:
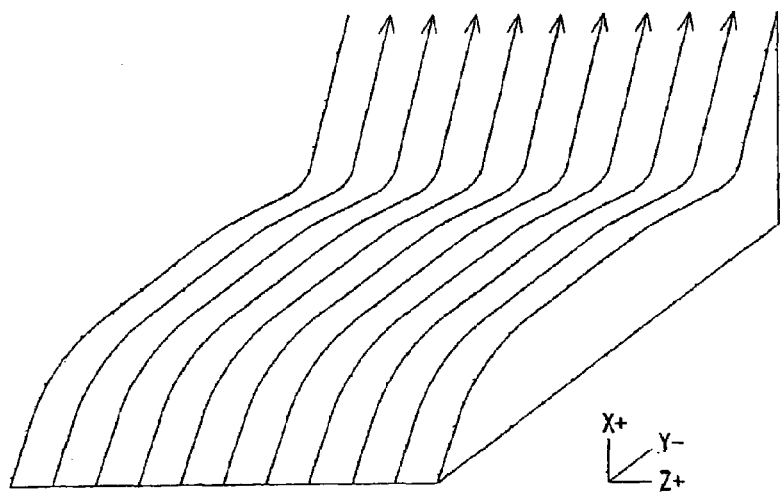
FIG. 17 is a figure showing an example of a displayed pattern in the second embodiment.

FIG. 17 shows an example of tool loci displayed before application of color discrimination in this embodiment, with arrows indicating movement directions of the loci, which are all the same here.

Figure 18:
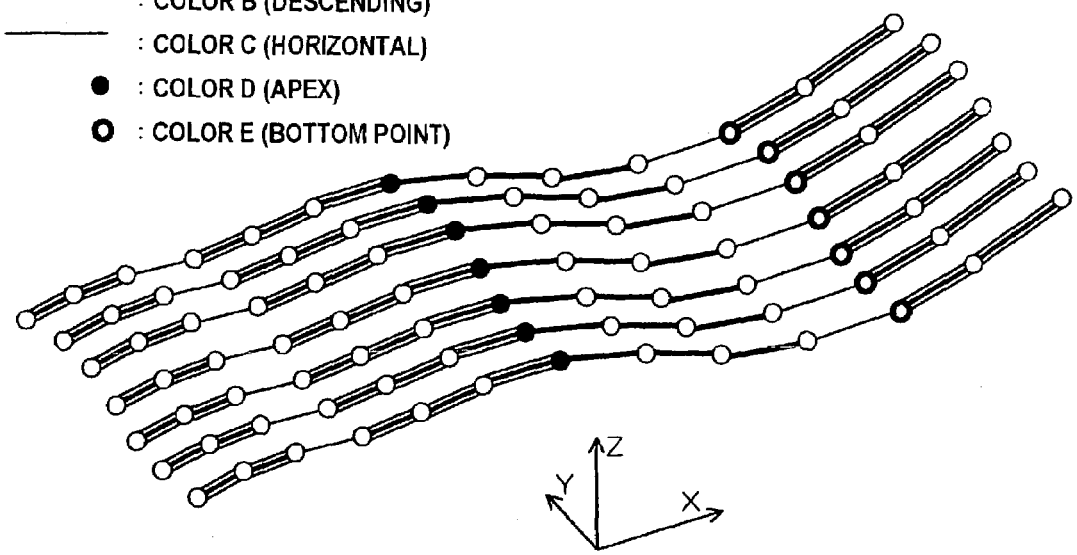
FIG. 18 is a figure showing another example of the displayed pattern of FIG. 17.

FIG. 18 shows an example of tool loci displayed with display property imparted thereto according to a movement direction of the minute segment.

As is obvious from the drawing, when using the Z-axis as a specific axis, a minute segment for NC data is displayed in color A when it moves in a positive or upward direction, in color B when it moves in a negative or downward direction, and in color C when it moves in a zero or horizontal direction. Therefore, because it is displayed in three different colors, the resultant displayed pattern, when shown as a whole on a monitor screen, enables ready visual recognition of movement directions of the respective tool loci. It should be noted that display property may be expressed by means of line types, as shown in FIG. 18, as well as colors.

As described above, in this embodiment, a movement direction of a minute segment relative to the specific axis is expressed by means of display property, and observation of the displayed pattern of the tool locus allows various analyses. The analyses enable determination of accuracy of NC data, verification of NC data upon occurrence of a machining defect on a product, and notification to a data manager of any experimentally expected problems with NC data, and so forth.

In FIG. 18, whether or not two successive minute segments move in different directions relative to the Z-axis, specifically, whether or not movement directions of two successive minute segments are different, is determined. When these directions of movement differ, in particular, when the movement directions change from positive to negative, zero to negative, an end point of the minute segment is represented as an apex by a solid circle in color D. When the directions change from negative to positive, zero to positive, on the other hand, the end point of the segment is represented as a bottom point by an empty circle in color E. This arrangement enables detailed visual analysis of tool loci.

In a further example of this embodiment, referring again to FIG. 16, a movement direction (negative, positive, or zero) of each minute segment relative to the specific axis is determined (S23); a display color for an endpoint of each minute segment is determined according to the movement direction of the minute segment (S24); and the end point is displayed in the thus determined color, that is, according to the movement direction of a relevant minute segment (S25).

Figure 19:
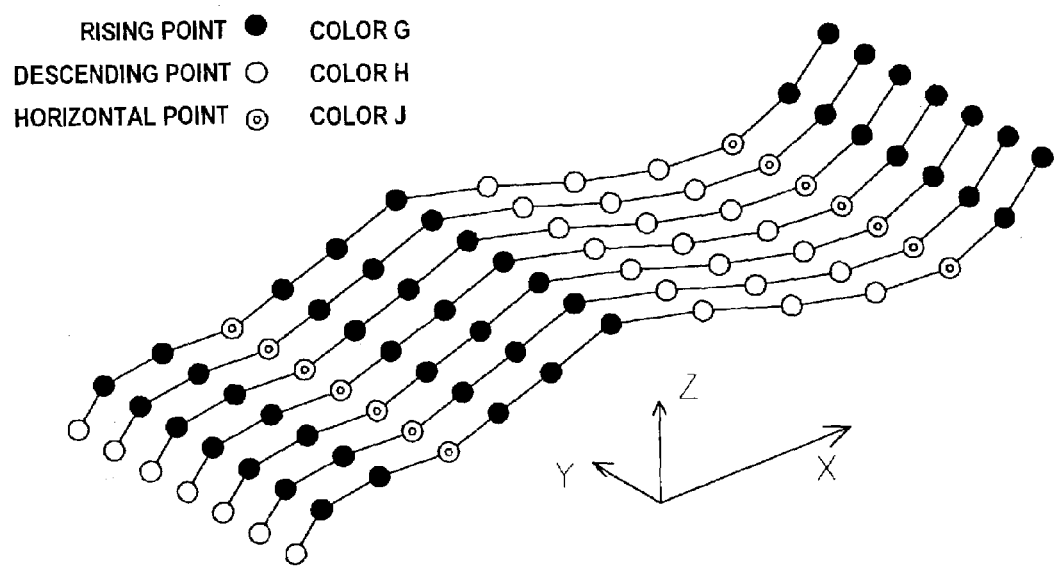
FIG. 19 is a figure showing still another example of the displayed pattern in the second embodiment.

That is, representation of the respective NC data points in colors respectively determined for rising, descending, and horizontal points as shown in FIG. 19, can also produce the same advantage as that which can be obtained by the arrangement of FIG. 18.

That is, in FIG. 19, the respective points are given display properties which are determined according to movement directions of their adjacent minute segments. Specifically, as is obvious from the drawing, when using the Z-axis as a specific axis, the trailing point of a minute segment in a positive, or upward, movement is shown in color G as a rising point; one in a negative, or downward, movement in color H as a descending point; and one in a zero, or horizontal, movement in color J as a horizontal point.

Therefore, because it is displayed in three different colors, the resultant displayed pattern, when shown as a whole on a monitor screen, allows visual recognition of the movement directions of the respective tool loci. It should be noted that representation using dots alone without any minute segment is also possible.

As described above, in this embodiment, a movement direction of a minute segment relative to the specific axis is expressed by means of display property imparted to an end point of the minute segment, and observation of the displayed pattern of the tool locus enables various analyses. The analyses include determination of accuracy of NC data, verification of NC data upon occurrence of any machining defect on a product, and notification to a data manager of any experimentally expected problems with NC data, and so forth.

As described above, this embodiment, in which different movement directions of minute segments relative to a specific axis are expressed by means of different display properties, enables ready recognition of such a small change of a tool locus as a region with different display property, that generally cannot be noticed from normal representation of tool loci.

In addition, display of an apex or a bottom point, at which movement directions of minute segments are changed relative to a specific axis, along with a designated display property, such as, for example, a color, enables ready recognition of a ridge or bottom line continuing from the change point. This can further enable ready recognition of such a small machining error with the ridge or bottom line that generally cannot be easily understood from normal representation of tool loci.

Further, this manner of display enables selective analysis on a specific portion of an ample amount of NC data in order to determine accuracy of NC data in data preparation or in comparison with an actual machining object.

In actuality, backlash, and thus problems, is likely to be caused at a point where movement directions of minute segments are changed as quadrants are changed. This embodiment allows data preparation and machining analysis while paying attention to such critical points, and facilitates recognition of problems.

Figure 20:
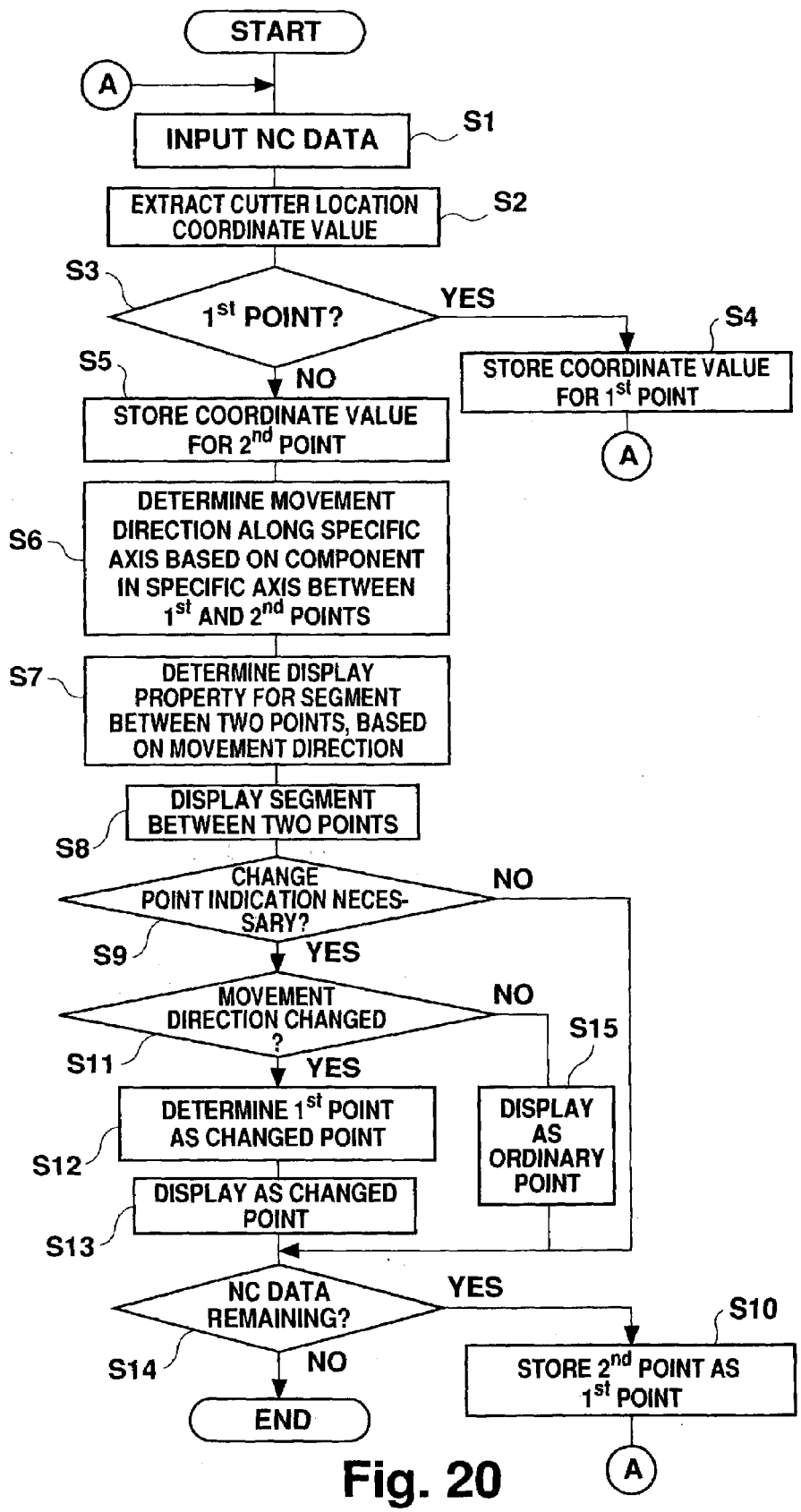
FIG. 20 is a flowchart of a tool locus displaying method in the second embodiment.

FIG. 20 is a flowchart of displaying a tool locus according to this embodiment.

Specifically, NC data is input (S1), and a cutter location coordinate value relative to a specific axis selected from the three axes is extracted (S2). Whether or not the extracted coordinate value relates to a first point is determined (S3). When it is determined that the extracted coordinate value does relate to a first point, the tool coordinate value is stored as a coordinate value for the first point (S4), and the process returns to S1.

When it is determined, however, that the extracted tool coordinate value does not relate to a first point, the value is stored as a coordinate value for a second point (S5). After a minute segment is thus specified by specifying tool coordinate values of the first and second points, the movement direction of the minute segment relative to the specific axis is determined (S6). Specifically, in FIG. 18, the movement direction is determined as either rising, descending, or horizontal, as described above. Subsequently, display property is imparted to each minute segment according to its movement direction (S7), and displayed with the imparted display property (S8).

Here, although an apex or bottom point of a minute segment is clearly indicated as a change point in FIG. 18, indication of a change point is not always necessary in this invention. Therefore, whether or not indication of changing points is necessary is determined (S9). When indication is found to be unnecessary, the process jumps to S14.

When, on the other hand, indication of a change point is necessary, the process proceeds to S11, where whether or not the movement directions are changed is determined. When no change in any of the movement directions are found, the process proceeds to S15, where the first point is determined as a no change point, to show the point in color of ordinary point the process jumps to S14.

When the movement directions are changed, on the other hand, the process proceeds to S12, where the first point is determined as a change point. Then, a display color for the point is determined such that an apex is shown in color D and a bottom point in color E (see FIG. 18) (S13).

Subsequently, whether or not coordinate values relative to the specific axis have all been examined as described above is determined (S14). If any un-examined NC data is left, the process returns to S10, to store the second point as a first point, before returning to S1 to repeat the above process with a next minute segment. When it is determined at S14 that no un-examined NC data is left, the process is then completed.

Figure 21:
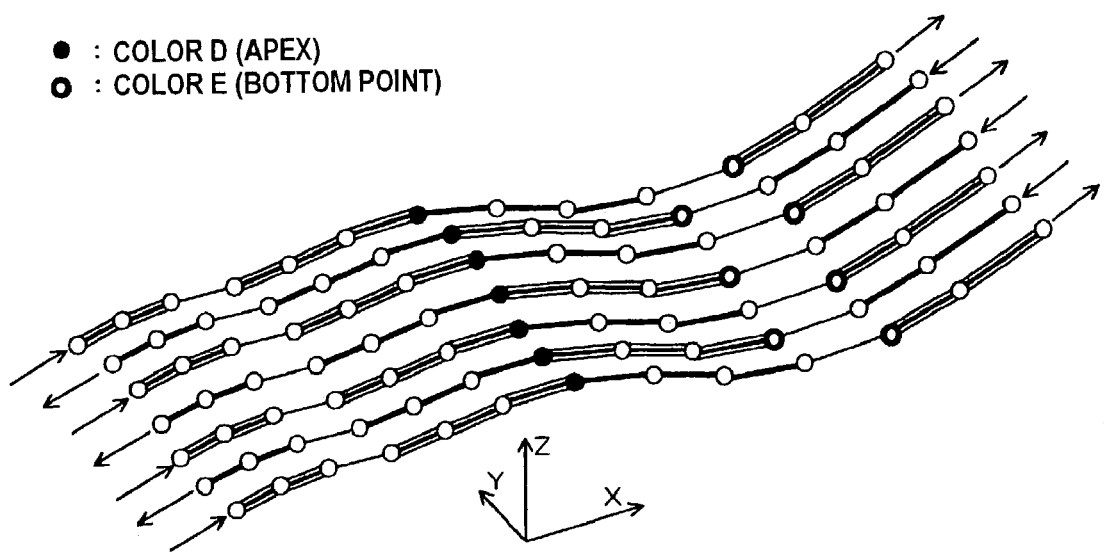
FIG. 21 is a figure showing an example of yet another displayed pattern in the second embodiment.

Here, although the respective tool loci move in the same direction, i.e., +X direction in FIGS. 18 and 19, there may be a case in which adjacent tool loci may direct in opposite directions from each other, as shown in FIG. 21, thus forming reciprocate movement. In this case, suppose that the first minute segment moves in a rising direction, the second minute segment should move in a descending direction. Therefore, the resultant displaying contains minute segments with different display properties alternately coexisting.

Although the manner of display in FIG. 21 allows ready recognition of concave and convex of tool loci when a machining direction and a movement direction of a minute segment retain some correlation, such as, for example, when an error is caused only in a first segment, or when routes of first and second segments slightly differ, it is not possible for a user to conceive, from a macro point of view, the state of concave and convex on a machining produce by just viewing the tool loci thus displayed because minute segments with different display properties alternately coexist in the display.

In order to address this problem, in this embodiment, display properties for reversed movement directions are respectively given to the first and second minute segments in a reciprocate movement. This can modify the display in FIG. 21 into that in FIG. 18, in which rising or descending tool loci are aligned adjacent to one another. This helps a data manager viewing the displayed tool loci on a monitor screen readily understand the movement directions of the respective minute segments.

In this embodiment, a movement direction of a tool locus relative to a specific axis is displayed with the imparted display property, and the resultant displayed pattern can be clearly shown on a monitor screen. This makes possible instant recognition of the nature of various NC data and, in particular, visual recognition of a point at which in movement directions are changed and thus backlash is likely to be caused.

This embodiment is also advantageous in that a cause of any machining defect can be easily determined.

Embodiment 3

In the following, a third preferred embodiment will be described with reference to the attached drawings.

Figure 22:
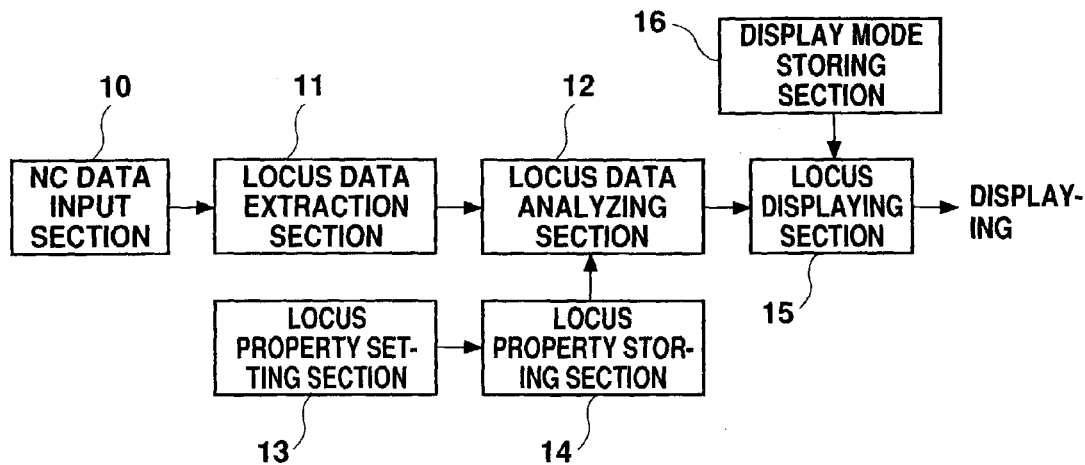
FIG. 22 is a block diagram showing a display device practicing a tool locus displaying method in a third embodiment of the present invention.

FIG. 22 is a block diagram showing a display device for practicing a display method according to this third embodiment. XYZ axial data is all input from an NC data input section 10, and sent to a locus data extraction section 11. In the locus data extraction section 11, only tool locus data is extracted from the XYZ axial data to thereby eliminate other control data. The extracted tool locus data is supplied to a locus data analyzing section 12, where desired display property is imparted thereto; this is a characteristic of this embodiment.

This embodiment is characterized in that a region relative to a specific axis, i.e., the Z-axis, selected from three axes is divided into divided regions for every predetermined width, first beginning with a desired reference point, and that each of the resultant divided regions is given a different predetermined display property.

In this arrangement, a tool locus is displayed like a contour line in a manner of being discriminated by color or line type for every divided region relative to the specific axis, or Z axis here.

This enables ready recognition of a peculiar nature of a tool locus relative to the specific axis by looking at the displayed pattern on a monitor screen, and a variety of NC data analyses can be applied based on the displayed pattern of a tool locus drawn with the selected display property. The analysis may include whether or not the originally intended tool locus is correctly embodied, and whether or not the original NC data is accurate, which may be determined based on whether or not the displayed pattern and an actual machining defective line coincide to each other, and so forth. Pattern confirmation for every machining type may also be conducted based on experiment or experience.

For assigning display properties, the device of FIG. 22 comprises a locus property setting section 13 and a locus property storing section 14. The locus property setting section 13 selectively sets display property, including a display color and/or a line type, which can be imparted to each of the divided regions. Based on the display property set, the locus property storing section 14 determines and stores a specific axis for the dividing, a coordinate value as a reference for the dividing, a value for a dividing width, colors or line types to be specified for the respective divided regions, and so forth. The designation data is supplied to a locus data analyzing section 12.

As described above, display property is imparted to every predetermined region relative to the specific axis, and the property data is supplied to a locus displaying section 15 together with data in connection with other axes. Based on the data, the tool locus can be displayed with the display property in a three-axis (XYZ) system. It should also be noted that, for the display, a display mode storing section 16 determines a desired display mode according to the desired viewing angle, a magnification power, and so forth.

Figure 23:
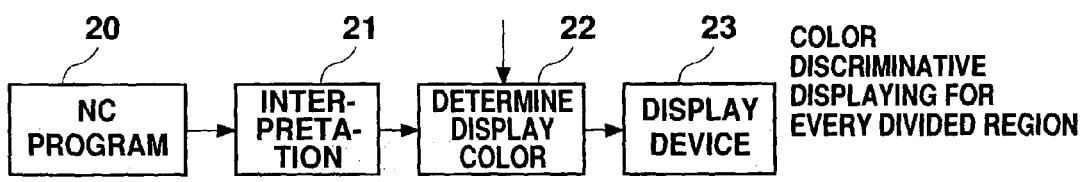
FIG. 23 is a figure showing an example of a process of and a displayed pattern for a tool locus displaying method in the third embodiment.
Figure 23:
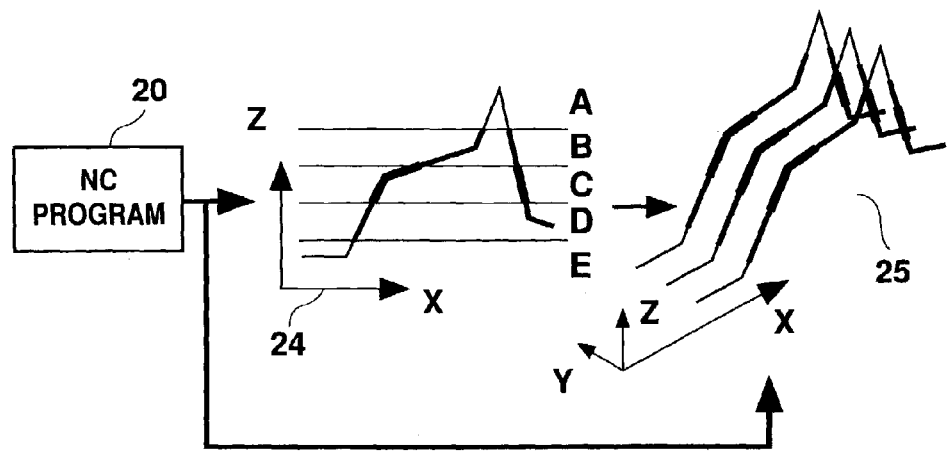

FIG. 23 schematically shows a process of and state for displaying a tool locus by the above-described display device in this embodiment.

NC data 20 is processed by the display device of FIG. 22. Specifically, a region relative to a specific axis is analyzed (S21), and assigned a display color (S22). Based on the assigned colors, the display device 23 conducts displaying in colors allocated to the respective divided regions (S23).

A displayed pattern 24 represents a displayed pattern of a tool locus shown on the XZ plane. Specifically, the XZ plane is divided at predetermined widths relative to the Z-axis, beginning with a desired reference point, and each of the resultant divided regions, referred to as E, D, C, B, A from closest to farthest relative to the X-axis, is given a different display property, which is expressed here by a different line type. The tool locus having this displayed pattern 24 shown on the XZ plane is shown as a displayed pattern 25 in the three-axial system.

Observation of the displayed pattern of a tool locus allows various types of analysis. The analyses in turn make it possible to determine whether or not NC data is correct, whether or not NC data is responsible for any machining defective line on a product, and so forth. Any experientially-known information on NC data may be provided to a data manager for the analyses.

Figure 24:
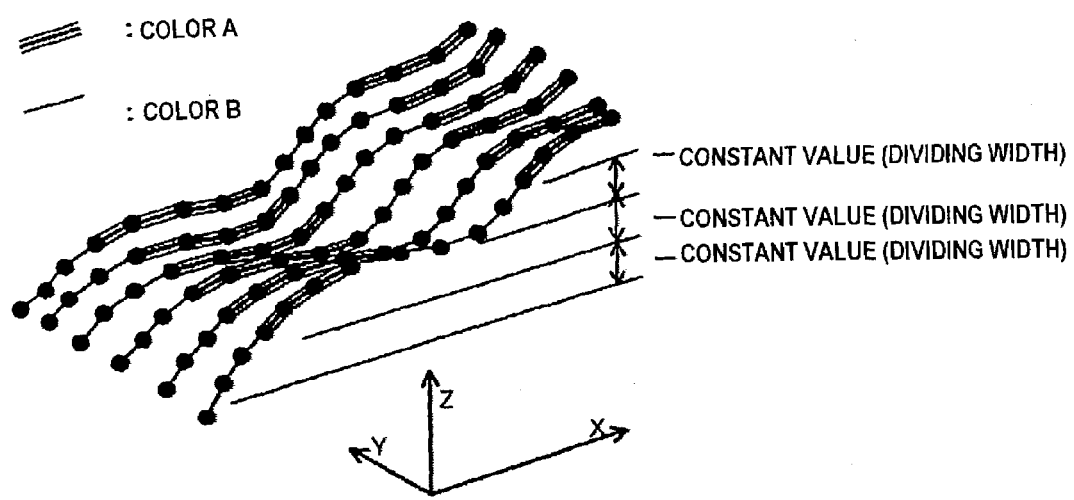
FIG. 24 is a figure showing another example of the displayed pattern of FIG. 23.

FIG. 24 shows another example of tool loci displayed with different display properties in a three-axis (XYZ) system. This corresponds to the tool locus with the displayed pattern 25 in FIG. 23, but differs in that only two colors A and B are employed. That is, impartation of unique display property to each of the divided regions is not required in this embodiment, and it is rather practical that only adjacent regions are given different display properties from each other, as shown in FIG. 24. Alternation of two kinds of display properties enables patterning over a vast region.

As described above, in this embodiment, a region relative to a specific axis is divided every predetermined width beginning with a predetermined reference point, and each of the respective divided regions is displayed with imparted display property. As a result, a tool locus is displayed in a unique displayed pattern relative to the specific axis. It should be appreciated that observation of the displayed pattern can enable useful conclusions. These analyses may be made when preparing NC data in order to assess, for example, the accuracy of the NC data. Moreover, as it is experientially known that a particular display pattern is almost always applied to some types of machining, it is possible to use a displayed pattern as an index for selective analysis on only a particular portion of an ample amount of NC data which appears relevant to that type of machining.

Figure 25:
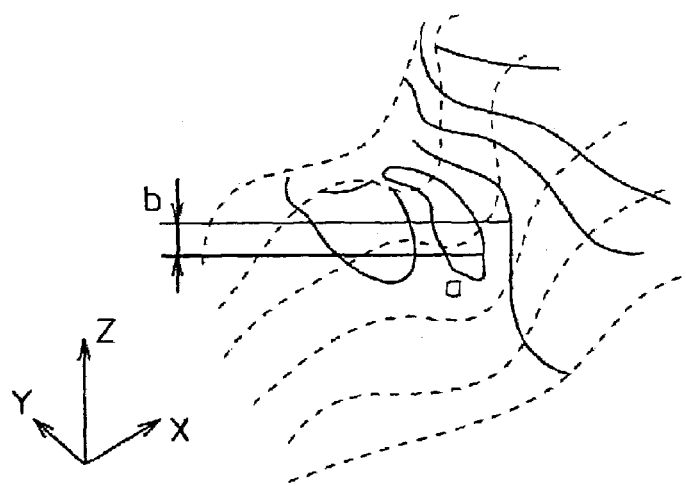
FIG. 25 is a figure explaining an example of designation of a region given display property in this embodiment.

Specifically, when a machining defective line caused on a surface of a complicated shape which is machined based on NC data is highly likely a cyclical defective line as shown in FIG. 25, an assumption is made that the defective line is cyclical. Then, a line attributable axis, relative to which the defective line is caused, for example, Z axis, is specified.

Then, one point of the defective lines relative to the specified axis (Z-axis here) is determined as a basic reference point a, as shown in FIG. 25, and its Z-axial coordinate value is obtained. Then, one point of an adjacent line relative to the specified axis is determined as point b, and its Z-axis coordinate value is obtained. Thereafter, a difference between the two Z-axis coordinate values is obtained, so that the difference is assumed as a pitch, in which the defective lines are caused.

The region relative to the defective line attributable axis is divided at widths corresponding to this cycle, and different display properties are given to the resultant divided regions. Then, the tool locus relative to the defective line attributable axis is displayed according to the display properties imparted to the respective divided regions.

Then, when an actual machining defective line caused on a product during machining based on the NC data coincides with a boundary of the divided regions, that is, different colors, it is proved that the assumption that the defective line is cyclical and that the defective line attributable axis is Z axis is correct. When the actual defective line does not coincide with the expected line, on the other hand, it is determined that the defective line is not cyclical.

It should be noted that, because the input points are often determined by actual measurement of a machining object, the actual and displayed defective lines may not coincide perfectly. However, substantial coincidence is sufficient and acceptable.

Figure 26:
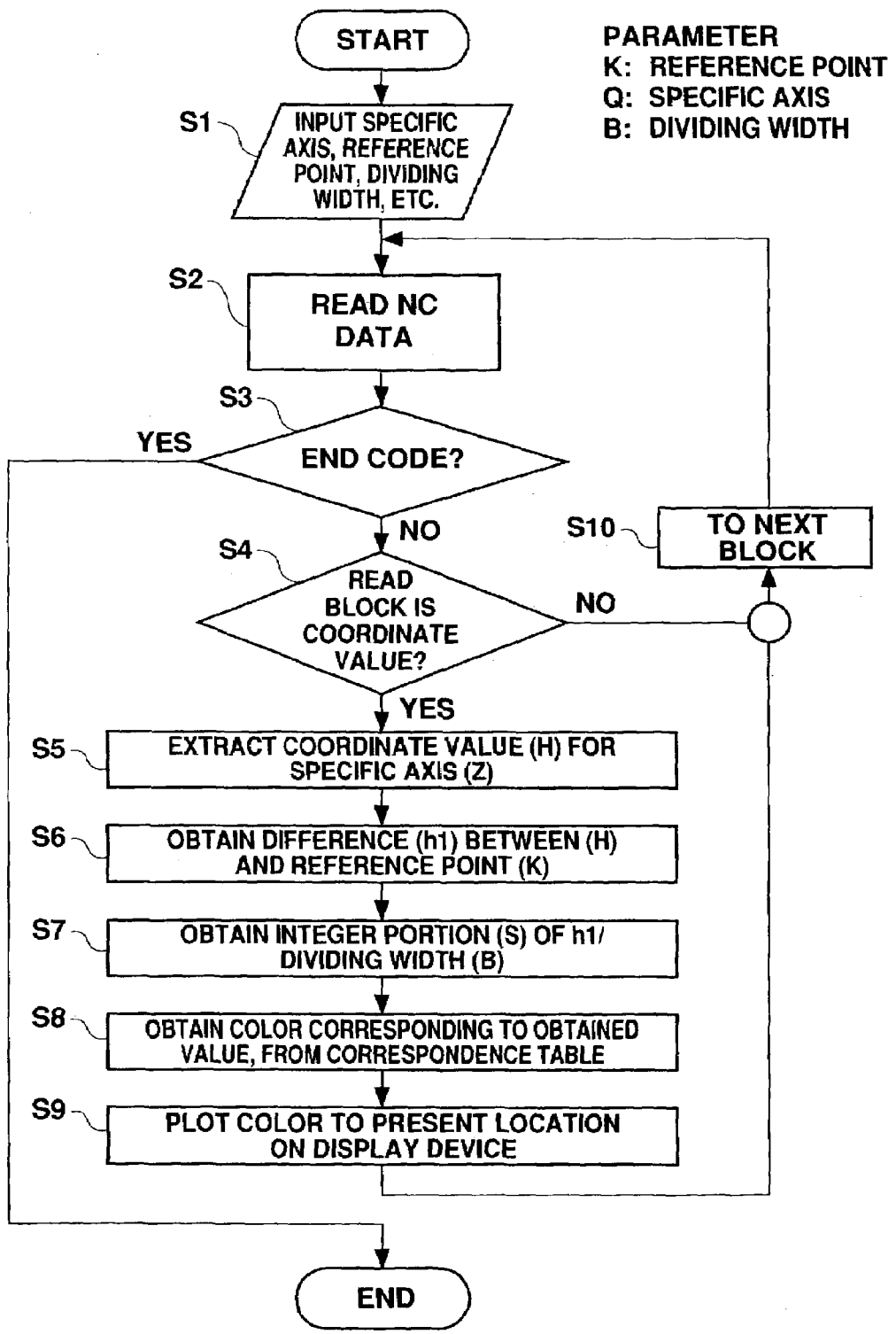
FIG. 26 is a flowchart of a tool locus displaying method according to the third embodiment.

FIG. 26 is a flowchart of a method for displaying a tool locus in this embodiment.

At S1, a specific axis, a dividing width, and a reference point are input.

Here, preferable applications of this embodiment for analysis on NC data may include estimation of a cause of a machining defective line resulted on a product which is machined based on NC data. Specifically, when a very fine scratch or strip-like line is caused on the surface of a machining object, it is generally difficult to determine a cause of the defective line, and thus to specify whether a machining device or NC data should be responsible for the defective line.

When the machining device is responsible, the machine may likely have a cyclical defect in a feeding axis, including accuracy of a feeding, screw or gear, torque ripple of a feeding motor, inaccuracy in position detector, and so forth, which most likely causes a cyclical lines on the surface of a machining object.

When NC data is responsible, on the other hand, it is often a case that an incorrect coordinate value is designated for a tool locus. Such inaccuracy must be eliminated. However, total elimination is not usually practical due to the difficulty of detecting erroneous data among such a large amount of NC data.

If non-commitment of NC data to a faint scratch or stripe-like line on the surface of a machining object can be readily proved, it will be very advantageous in that analysis of an ample amount of NC data is unnecessary, and that the involved operation can thereby be remarkably simplified.

This improvement is particularly useful when the defective line is cyclical, and this embodiment can promptly determine the level to which a cyclical defective line correlates with NC data.

A line attributable axis can be specified, as a specific axis, based on an actual machining defective line. Once a line attributable axis is specified, a line cycle in the direction of the specific axis can be determined based on a machining defective line which appears cyclical, so that the determined line cycle is used as a dividing width.

That is, a specific axis, a dividing width, and a reference point, which are input at S1 in FIG. 26, may be either any desired value or specific values based on an actual machining defective line.

In this embodiment, a reference point is determined based on one of the defective lines caused on a machined surface, and a line cycle is defined by a cycle in which actual cyclical lines are caused, converted so as to be represented along the specific axis.

It is advantageous that the line attributable axis is determined based on an actual machining defective line, and set as the specific axis in this embodiment, although selection of the line attributable axis from among the three axes largely depends on the operator's experience.

Returning again to FIG. 26, subsequently, NC data is read out in block units because NC data is generally constituted of blocks (S2). Then, whether or not the read NC data block is an end code is determined (S3). When so determined, the process is then completed as no more NC data is left.

When, on the other hand, the read NC data block is not an end code, the process proceeds to S4, for extraction of locus data, i.e., a coordinate value, from the respective block data which may additionally contain control data other than locus data. When the NC data contains only control data other than locus data, the process returns from S10 to S2.

Thereafter, from the extracted locus data at S4, only a coordinate value relative to the specific axis is extracted as a coordinate value H (S5). Then, a difference (h1) between the extracted coordinate value H and a reference point (k) is obtained (S6). This processing is applied to all of the extracted values H.

Then, the difference (h1) is divided by a dividing width B to obtain an integer portion (S) of the result (S7), and predetermined display property, that is a display color, is obtained from a correspondence table according to the obtained integer portion (S8). Thereafter, the obtained color is plotted to a point to thereby display the block read into the display device (S9).

The above series of processing is repeated until it comes to an end block, through which a tool locus as shown in FIG. 24 can be drawn. It should be noted that color plotting at S9 is applied in a three-axis system including the specific axis given predetermined display property and the remaining two axes.

As described above, a tool locus is displayed with the imparted display property, and observation of the resultant displayed pattern enables analysis of NC data.

As also described above, when the displayed pattern based on predetermined display property coincides with an actual machining defective line caused on a machining object, it can be concluded that the machining defective line is cyclical, which leads to an estimation that NC data is correct and the machining device should be responsible for the defective line. Therefore, because evaluation of the ample amount of NC data is unnecessary, a cause of the defective line can be advantageously determined in a reduced amount of time.

It should be noted that, whereas the reference point and the dividing width are determined based on actual measurements in this embodiment, random values maybe used for trial-and-error attempts, or experientially known values may be used.

In this embodiment, a tool locus relative to a specific axis is displayed like a contour line, and the resultant display pattern can be clearly shown on a monitor screen. Such a displayed pattern allows instant recognition of the characteristics of NC data and, moreover, should any machining defective line be caused, allows readily determination as to whether the NC data or the machining device is responsible for the defective line.

In addition, in this embodiment, it is possible to determine whether or not even a machining defective line resulted in machining a complicated shape is cyclical. This is advantageous in that it could eliminate the need of verifying NC data if it is concluded that a machining device, rather than NC data, is responsible. With such a conclusion, because only the machining device need be checked, the cause of a defective line can be more rapidly detected.

It should be noted that the a five-axial system comprising three (XYZ) axes and two other rotation (AB) axes is referred to in the above, the present invention can be similarly applied to a system using other axis, such as U, V, W axes and C axis. In such an application, A minute segments of three (XYZ) axes are calculated in consideration of a distance between a rotation center and the tip end of the tool in the case of a five-axial system.

While the present invention is described in terms of exemplary embodiments, it is not limited hereto.

What is claimed is:

1. A method for visually displaying a tool locus with a varying visual display property that assists in the visual detection of machining defects, the tool locus being defined by NC data for machining a machining object by means of XYZ-axial feeding of a tool, comprising:

assigning to NC data a display property corresponding to the NC data that varies based on tool movement; and displaying on a display device a tool locus in a displaying state according to the assigned display property in order to assist in the visual detection of defects.

2. A method for visually displaying a tool locus with a varying visual display property that assists in the visual detection of machining defects, the tool locus being defined by NC data which defines the tool locus for machining a surface having a predetermined shape, in the form of a group of dots aligned at a minute interval, comprising:

calculating a curvature radius of the tool locus at each of two or more NC data points selected from the group of dots; and displaying the NC data point or its succession with other points on a display device with a visual display property that varies according to the magnitude of the curvature radius in order to assist in the visual detection of defects.

3. The method according to claim 2, wherein the display property is a display color which is determined in advance according to the magnitude of the curvature radius.

4. The method according to claim 2, wherein the display property is a radial segment which is determined according to the magnitude of the curvature radius.

5. The method according to claim 2, wherein the display property is a circular representation according to the magnitude of the curvature radius.

6. The method according to claim 2, wherein the display property is a numerical value according to the magnitude of the curvature radius, assigned to each of the NC data points.

7. The method according to claim 2, wherein the display property is a graph representation according to the magnitude of the curvature radius.

8. A method for visually displaying a tool locus with a varying visual display property that assists in the visual detection of defects, the tool locus being defined by NC data for machining a machining object along minute segments of three(XYZ) axes, which is calculated in consideration of a distance between a rotation center and the tip end of the tool in the case of a five-axial system comprising three (XYZ) axes and two other rotation (AB) axes, in the form of the minute segments or a collection of end points of the minute segments, the method comprising:

determining whether a moving direction of each minute segment relative to a specific axis is positive, negative, or zero; and displaying the minute segment or an end point of the minute segment on a display device with a display property that varies according to the movement direction in order to assist in the visual detection of defects.

9. A method for visually displaying a tool locus with a varying visual display property that assists in the visual detection of defects, the tool locus being defined by NC data for machining a machining object by utilizing a minute segment defined in a three-axial (XYZ) system, in the form of the minute segments or a collection of end points of the minute segments, comprising:

determining whether a moving direction of each minute segment relative to a specific axis is positive, negative, or zero; and displaying on a display device, when movement directions of two successive minute segments are different, a point at which the two minute segments are connected, as a change point highlighted with a marker to visually identify the change point in order to assist in the visual detection of defects.

10. A method for visually displaying a tool locus with a varying visual display property that assists in the visual detection of defects, the tool locus being defined by NC data for machining a machining object by means of three-axial (XYZ) feeding, comprising:

dividing a region in a direction of a specific axis selected from the three axes into divided regions at every predetermined dividing width, beginning with a predetermined reference point;

assigning a different predetermined display property to each of the divided regions; and displaying on a display device the tool locus relative to the specific axis in a three-axial (XYZ) system according to the display property assigned to each of the divided regions in order to assist in the visual detection of defects.

11. The method according to claim 10, wherein the divided regions are assigned display properties such that display properties of at least adjacent divided regions are different.

12. An NC data analyzing method for determining whether or not NC data is accurate with reference to a tool locus defined by the NC data for machining a machining object by means of three-axial (XYZ) feeding, the method comprising the steps of:

dividing a region in a direction of a specific axis selected from the three axes into divided regions at every predetermined dividing width, beginning with a predetermined reference point;

assigning a predetermined display property to each of the divided regions;

displaying the tool locus relative to the specific axis in a three-axial (XYZ) system according to the display property assigned to each of the divided regions; and estimating that the NC data is accurate and that a machining device is defective when a machining defective line on the machining object coincides with a displayed pattern of the tool locus displayed with the given display property.

13. An NC data analyzing method for determining whether or not NC data is accurate with reference to a tool locus defined by the NC data for machining a machining object by means of three-axial (XYZ) feeding, the method comprising the steps of:

specifying a line-attributable axis with reference to a machining defective line on the machining object;

determining one defective line relative to the specified line-attributable axis as a reference point;

dividing, while assuming a difference between the machining defective line and its adjacent machining defective line as a line cycle, a region relative to the specified line-attributable axis at every width corresponding to the line cycle; and displaying the tool locus according to predetermined display properties given to the respective divided regions; and estimating that the NC data is accurate and that a machining device is defective when a machining defective line on the machining object coincides with a displayed pattern of the tool locus displayed with the given display property.

* * * * *